May 12, 1970 — R. W. GILBERT — 3,512,022

FLYWHEEL FLUTTER FILTER

Filed Feb. 21, 1968

INVENTOR.
ROSWELL W. GILBERT
BY
*Curtis, Morris & Safford*
ATTORNEYS

3,512,022
FLYWHEEL FLUTTER FILTER
Roswell W. Gilbert, New York, N.Y., assignor to Dictaphone Corporation, Bridgeport, Conn., a corporation of New York
Filed Feb. 21, 1968, Ser. No. 707,249
Int. Cl. H02k 7/02
U.S. Cl. 310—74    6 Claims

ABSTRACT OF THE DISCLOSURE

A resonant torsional pendulum in the form of a spring-coupled mass is provided on the shaft of an A-C motor and tuned to the torque pulse frequency of the motor thereby to neutralize velocity flutter and produce a flat torque output with a load.

---

This invention relates to electric motors, and more particularly to mechanical means for eliminating rapid but regular variations of the motor output shaft.

Single-phase A-C motors characteristically exhibit a rotor driving force that is proportional to the square of the sinusoidal current through the winding, which is a twice-frequency sinusoid plus a D-C torque component that is at best smaller than the A-C component. This characteristic results in a torque ripple which is at least one hundred percent of the averaged torque output of the usual A-C motor. In small motors operated by 60-cycle line frequency the resultant velocity modulation inherent in the rotor output is considerable and is objectionable in machines such as dictating machines, phonographs, tape recorders and the like which require a substantially flutter-free drive. The application of a brute force moment in the form of a directly-connected flywheel of sufficient mass to eliminate the velocity modulation is discouragingly ineffective as the mass of such a flywheel must be very large in proportion to the size of the motor, resulting in a starting time which is excessive and in space requirements which make such machines unnecessarily cumbersome.

In accordance with a preferred embodiment of the present invention, a centerless rim fywheel is appended to the rotor shaft by means of a spring-compliance-coupling to act as a resonant torsional pendulum to absorb the A-C torque component of the motor output shaft and thus effectively eliminate velocity modulation. Provision is also made to resonate the flywheel moment by means of radially oriented screws which both static-balance the rotating system, and allows the torsional pendulum to be tuned so that it oscillates at the same frequency as the A-C torque component of the motor.

The advantages of such a preferred embodiment include effective elimination of velocity modulation of the output shaft of an A-C motor, provision to mutually resonate an appended spring-coupled mass to fine-tune the frequency of oscillation and efficient utilization of a limited inertial moment. These and other aspects and advantages will be come further apparent from the accompanying specification when considered in conjunction with the accompanying drawing, wherein.

Figure 1:
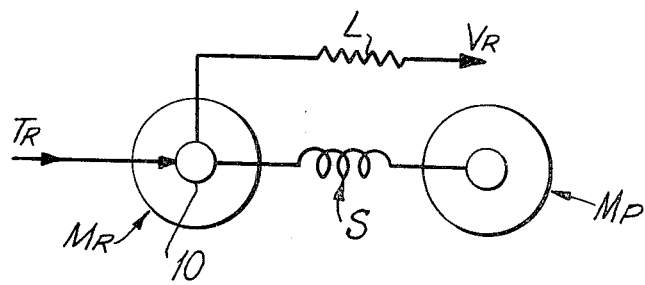
FIG. 1 is a schematic representation of the present invention.

Referring now to the drawing and particularly to FIG. 1, there is shown a mechanical schematic representation of a shaft 10 of a rotor from an A-C single-phase motor which produces a rotor torque $T_r$ having the characteristic of a uniform D-C torque component plus an A-C torque component proportional to the square of the sinusoidal winding current or a twice-frequency sinusoid. In the case of a 60-cycle A-C power supply, this A-C torque component will have a frequency of 120 cycles per second. The A-C torque component produces a periodic velocity flutter in the motor output shaft which, if left uncorrected, would cause a periodic torque pulsation in the power transmission across load L. Where such a motor is used in recording equipment this velocity modulation or flutter of the rotor output shaft may be as much as four or five precent of the rotor velocity, and it produces unwanted and undesirable background noises in the recording instruments. Ideally, velocity flutter should not exceed one percent for speech, and one tenth of one percent for music reproduction, in order to attain a high level of fidelity.

To neutralize the effect of this velocity flutter inherent in the output of single-phase A-C motors, an appended pendulum moment $M_p$ is coupled to the rotor output by means of a spring-compliance-coupling S. The appended moment acts as a torsional pendulum, whose resonant frequency $(M_p S)-\frac{1}{2}$ is tuned to the flutter pulse frequency of the rotor, i.e., twice the line supply frequency. If the pendulum compliance and moment have a high "Q," i.e., the ratio between stored energy and rate of energy dissipation, added damping is not necessary and serves no constructive purpose.

In steady-state operation an appended pendulum oscillates at the flutter frequency, and, if loss-less, at a forced amplitude that will apply an exact compensatory torque through the spring compliance to the rotor, leaving only the D-C component of the torque effective upon the rotor. The resultant rotor velocity $V_r$ across the load L therefore will be a uniform and constant velocity, effectively with no velocity modulation or flutter. This condition is attained and maintained by a disappearing increment of rotor flutter that will decay to zero is the pendulum is precisely tuned and loss-less. The system requires no additive damping because it is coupled to the resistive component of the load on the motor. The transient conditions resulting from a change of load upon, or supply to, the motor will decay simultaneously with the exponential transition of the D-C torque and velocity components.

Figure 2:
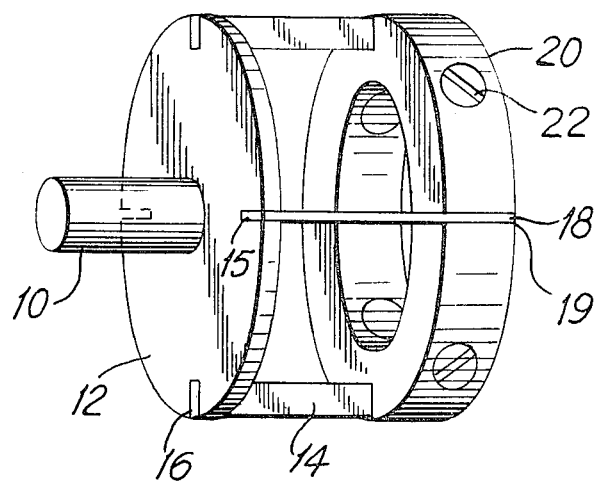
FIG. 2 is a perspective view of a preferred embodiment of the present invention.

Referring now to FIG. 2, there is shown a preferred embodiment of the invention where a motor shaft 10 has a disc 12 mounted at its end with four spaced flat springs 14 extending from the other side. Any number of flat springs 14 can be employed to provide this spring coupling, with three being the minimum for effective operation. The springs 14 are mounted at one end 14 in radial slots 16 in the disc 12, and at the other end 18 in similar radial slots 19 in an appended mass which supplies the inertial moment and which is illustratively, a centerless rim flywheel 20. This flywheel 20 supplies the pendulum moment, and the overall compliance of the springs and the flywheel moment are mutually resonated by means of four quadrant slug screws 22 which are threadably received in the periphery of the flywheel 20. The screws 22 are adjusted by turning them in or out to both static-balance the rotating pendulum mass, and also to fine-tune the pendulum so that its period of oscillation is precisely responsive to the flutter pulse frequency of the rotor shaft 10.

The flat springs 22 are arranged with their major widths on radii, and they thereby combine to provide substantial radial stiffness so that the only allowable compliant mode of motion is torsional. Also, with the specific orientation employed, the springs are free to foreshorten with deflection, because the flywheel 20 is free to move axially, the compliance will remain essentially linear over a substantial displacement, thus providing a wide range to the compensation of the rotor flutter frequency.

It is thus seen that the invention provides a flutter filter for A-C motors which effectively compensates for the sinusoidal velocity component or flutter frequency of the motor rotor, while providing an essentially lossless pendulum mass which maintains linearity over an excursion as great as several degrees of angle. Further, the pendulum mass is resiliently coupled to the motor rotor in such a manner as to provide a stiffness in all unwanted modes, while allowing appreciable torsional displacement. This provides an efficient utilization of limited inertial mass in applications where a constant frequency flutter must be eliminated, and where a rigidly coupled inertial mass of the conventional flywheel type, having a mass large enough to accomplish the same purpose, would not be feasible due to limited available space. In order to provide the same efficiency for eliminating velocity flutter it has been found that a directly coupled flywheel having one hundred times the moment must be employed. Thus, the spring-coupled flywheel of the present invention provides a considerable saving in space and weight.

While the flywheel-flutter filter of the present invention has been described as being coupled directly to the output shaft of an A-C motor, it is of course obvious that such a direct coupling is not necessary. This flywheel-flutter filter also may be employed to eliminate undesired velocity flutter in a driven shaft, i.e., a capstan of a tape recorder, at a point removed from but coupled to the output shaft of a motor drive.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

What is claimed is:

1. A resonant flutter filter for A-C motors having an output shaft comprising:
   mounting means fixed to said shaft,
   axially extending spring means having one end fixed to said mounting means and,
   an annular inertial mass fixed to the other end of said spring means,
   said spring means being adapted to flex torsionally in planes parallel to said shaft and having substantial radial stiffness whereby said mass is restricted to torsional movement and axial displacement with respect to said shaft.

2. The apparatus as defined in claim 1 wherein said spring means comprises at least three flat springs having their major widths lying in planes extending radially from said shaft whereby said springs are adapted to flex torsionally and to maintain radial rigidity in the apparatus.

3. The apparatus of claim 2 wherein a plurality of spaced adjustment means are provided on said flywheel for selectively varying the moment of inertia of said flywheel thereby to provide a fine tuning adjustment to vary the period of oscillation of said flywheel.

4. A resonant flutter filter for A-C motors comprising:
   a centerless rim flywheel for supplying a moment of inertia, said flywheel being adapted to be appended to the shaft of an A-C motor by means of a plurality of circumferentially spaced axially extending flat springs providing a spring compliance between said shaft and said flywheel to compensate for periodic velocity flutter of said shaft,
   said flat springs being oriented such that their major widths are in planes of the radii of said flywheel and their minor widths are in planes perpendicular to said radii whereby said spring compliance is torsional and said flywheel is restricted to axial and torsional displacement with respect to said shaft to effect linear compliance over a wide range of flutter frequencies.

5. The apparatus as defined in claim 4 wherein said flywheel includes means to selectively vary the moment of inertia of said flywheel thereby to provide a fine-tuning adjustment to vary the period of oscillation of said flywheel and to accurately correlate the torsional oscillation of said flywheel with the periodic velocity flutter of said shaft.

6. The apparatus as defined in claim 5 wherein said means to selectively vary the moment of inertia of said flywheel includes a plurality of spaced adjustment screws, said screws being mounted on the perimeter of said flywheel and being radially adjustable.

References Cited

UNITED STATES PATENTS

| | | | |
|---|---|---|---|
| 1,951,995 | 3/1934 | Schaad | 58—107 |
| 2,385,252 | 9/1945 | Bennett | 58—107 |
| 2,484,241 | 10/1949 | Mulheim | 310—51 |
| 3,058,371 | 10/1962 | Haushalter | 74—574 |
| 3,078,737 | 2/1963 | McGavern | 74—574 |
| 3,226,579 | 12/1965 | Bygdnes | 310—51 |

FOREIGN PATENTS 400,957　11/1933　Great Britain.

WARREN E. RAY, Primary Examiner

M. BUDD, Assistant Examiner

U.S. Cl. X.R.

74—573, 574; 310—51